(12) United States Patent
Eltabakh et al.

(10) Patent No.: US 11,775,546 B2
(45) Date of Patent: Oct. 3, 2023

(54) CORRELATION-DRIVEN QUERY OPTIMIZATION FOR CLOUD-BASED STORES

(71) Applicant: Teradata US, Inc., San Diego, CA (US)

(72) Inventors: Mohamed Ahmed Yassin Eltabakh, Worcester, MA (US); Mohammed Al-Kateb, Rancho Palos Verdes, CA (US); Sanjay Nair, El Segundo, CA (US); Awny Kayed Al-Omari, Cedar Park, TX (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 17/137,580

(22) Filed: Dec. 30, 2020

(65) Prior Publication Data

US 2022/0207052 A1 Jun. 30, 2022

(51) Int. Cl.
| | |
|---|---|
| *G06F 7/00* | (2006.01) |
| *G06F 16/25* | (2019.01) |
| *G06F 16/22* | (2019.01) |
| *G06F 16/901* | (2019.01) |
| *G06F 16/242* | (2019.01) |
| *G06F 16/2455* | (2019.01) |

(52) U.S. Cl.
CPC ........... *G06F 16/252* (2019.01); *G06F 16/221* (2019.01); *G06F 16/2433* (2019.01); *G06F 16/24554* (2019.01); *G06F 16/9017* (2019.01)

(58) Field of Classification Search
CPC .............. G06F 16/221; G06F 16/2433; G06F 16/24554; G06F 16/9017; G06F 16/252
USPC ................................ 707/714, 736, 745, 769
See application file for complete search history.

(56) References Cited

U.S. PATENT DOCUMENTS

| | | | |
|---|---|---|---|
| 2005/0038784 A1* | 2/2005 | Zait | G06F 16/24557 707/999.005 |
| 2016/0179886 A1* | 6/2016 | Au | G06F 16/2456 707/714 |
| 2016/0335304 A1* | 11/2016 | Teodorescu | G06F 3/0481 |
| 2019/0114295 A1* | 4/2019 | Cao | G06F 16/24535 |

* cited by examiner

*Primary Examiner* — Md I Uddin
(74) *Attorney, Agent, or Firm* — Gates & Cooper LLP (57) ABSTRACT

A method and apparatus for optimizing a query in a relational database management system (RDBMS) when a predicate on a data column in the query has a correlation to a partitioning attribute of a partitioning column in data retrieved from a cloud-based store, wherein the optimizing uses the correlation between the data column in the query to the partitioning column in the data retrieved from the cloud-based store for data elimination when processing the query. The correlation is defined in a formula or lookup data structure that maps or range-maps from the data column to the partitioning column.

17 Claims, 5 Drawing Sheets

CORRELATION-DRIVEN QUERY OPTIMIZATION FOR CLOUD-BASED STORES

BACKGROUND OF THE INVENTION

1. Field of the Invention

This invention relates to methods and systems for correlation-driven query optimization for cloud-based stores.

2. Description of Related Art (Note: This application references a number of different publications as indicated throughout the specification by one or more reference numbers within brackets [x]. A list of these different publications ordered according to these reference numbers can be found below in the section entitled "References." Each of these publications is incorporated by reference herein.)

Cloud-based stores, e.g., Simple Storage Service™ (S3) offered by Amazon Web Services™ (AWS), Azure™ blob storage, Google™ cloud storage, as well as distributed file systems like Hadoop Distributed File System (HDFS), are increasingly being integrated with relational database management systems (RDBMS) that process structured query language (SQL) queries. This integration makes the data files in these cloud stores visible and queryable from within the SQL queries. Given the typical massive sizes for these files, optimizing their access and retrieving only the segments (partitions) relevant to an SQL query is crucial for efficient execution.

Most existing access optimizations leverage only the partitioning column(s), i.e., the system keeps track of the storage hierarchical structure (the directories and sub-directories) and their associated columns, which might be artificial columns, and can skip subsets of this hierarchy only if there is explicit condition on these associated columns [1, 2, 3, 4]. Some other work leverages internal properties of the file format, e.g., Parquet and Optimized Row Columnar (ORC) file formats, to eliminate irrelevant segments from files [1, 2].

The related work can be divided into two main categories:
Techniques for optimizing the access to the cloud-based stores [1, 2, 3, 4]. These techniques optimize the execution only when predicates are explicitly on the partitioning columns. Yet, they fail to optimize queries when predicates are on non-partitioning columns.
Techniques for exploiting correlations in query optimizations [5, 6, 7, 8, 9, 10]. There are several techniques in literature, however, most of them are in the context of relational database system [5, 6, 7, 8, 9]. The ideas in these systems have not yet applied to eliminating files in cloud stores. The work in [10] is on Hive™ system, but mostly focuses on managing soft correlations and exception handling at the record-level.

Thus, there is a need in the art for improved methods and systems for optimizing queries involving cloud-based stores. The present invention satisfies this need.

SUMMARY OF THE INVENTION

The present invention is directed to optimizing a query in an RDBMS when a predicate on a data column in the query has a correlation to a partitioning attribute of a partitioning column in a cloud-based store, wherein the optimizing uses the correlation between the data column in the query to the partitioning column in the cloud-based store for data elimination when processing the query. The correlation is defined in a formula or lookup data structure that maps or range-maps from the data column to the partitioning column.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

1 OVERVIEW

This invention proposes going beyond the explicit partitioning of columns based on partitioning attributes in an RDBMS and proposes leveraging predicates on other data columns if the attributes of the data columns are correlated, in some form, to the partitioning attributes. These correlation-driven optimizations result in optimization and performance that otherwise will be missed. Moreover, in a cloud-based environment, the proposed optimizations not only result in faster query execution and less data transfer, but also monetary savings to customers. The proposed optimizations are generic and applicable to commercial and open-source database management systems and data analytics system. They would bring direct benefit to cloud-based customers.

These and other aspects of the present invention are described in more detail below.

2 HARDWARE AND SOFTWARE ENVIRONMENT

Figure 1:
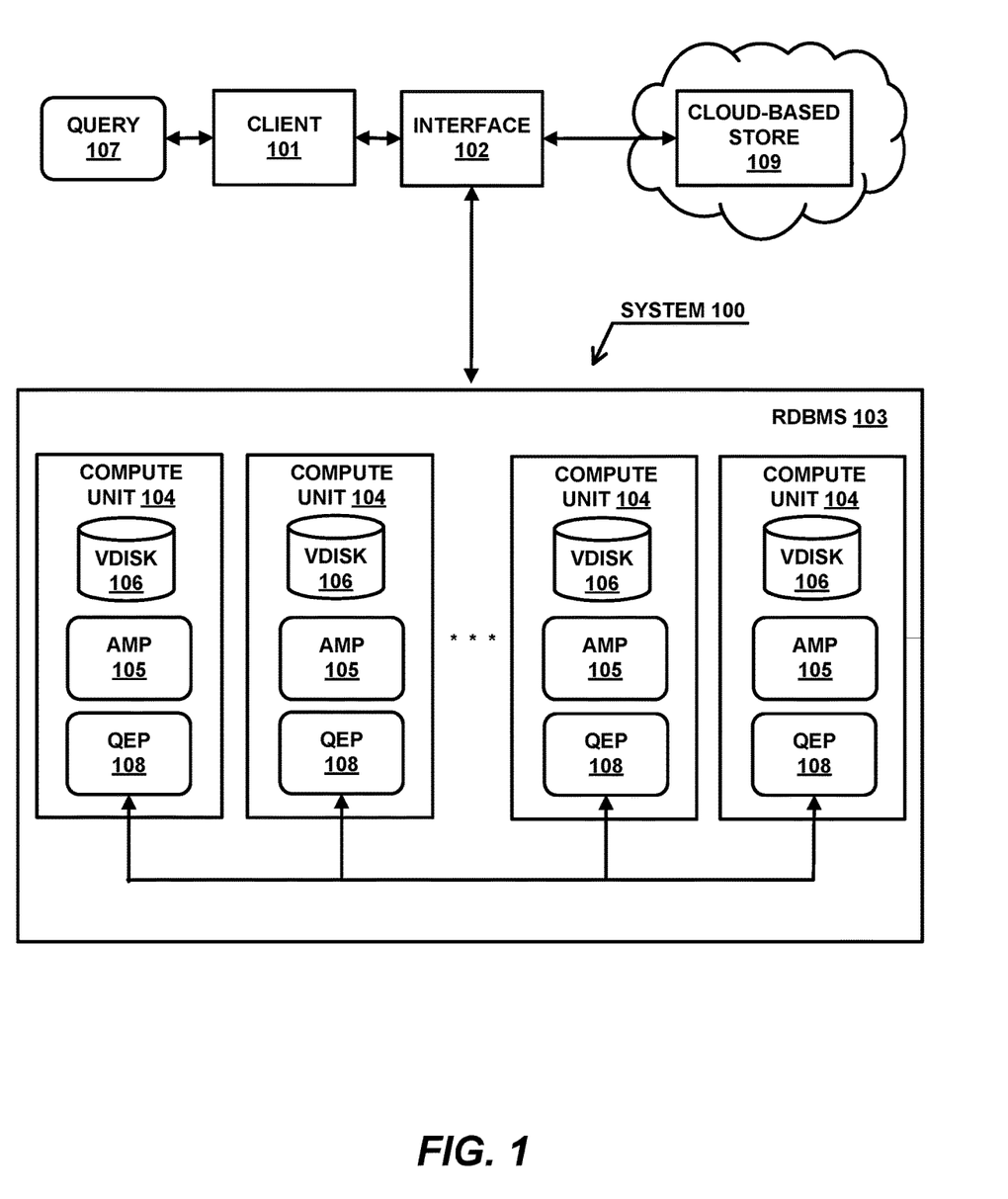
FIG. 1 illustrates an exemplary hardware and software environment, according to one embodiment of the present invention.

FIG. 1 illustrates an exemplary hardware and software environment according to one embodiment of the present invention. In the exemplary environment, a computer system 100 implements a data warehouse in a three-tier client-server architecture, wherein the first or client tier provides clients 101 that may include, inter alia, a graphical user interface (GUI), the second or middle tier provides an interface 102 for interfacing with the data warehouse, and the third or server tier comprises the data warehouse, which is a Relational DataBase Management System (RDBMS) 103 that stores data and metadata in a relational database. The first, second, and third tiers may be implemented in separate computers, or may be implemented as separate or related processes in a single computer.

In the preferred embodiment, the RDBMS 103 is executed by one or more compute units 104, e.g., processors, in the computer system 100, wherein the RDBMS 103 manages a relational database comprised of one or more tables stored on one or more data storage devices connected to the computer system 100. In one embodiment, the computer system 100 is comprised of one or more access module processors (AMPs) 105 performing the functions of the RDBMS 103 and one or more virtual disks (VDISKs) 106 storing the relational database of the RDBMS 103. The AMPs 105 and VDISKs 106 may be implemented in separate processors, or may be implemented as separate or related processes in a single processor.

The RDBMS 103 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, operators or users of the system 100 interact with the clients 101 to formulate a workload comprised of one or more queries 107 for the RDBMS 103, wherein the requests are transmitted via the interface 102 to the RDBMS 103, and responses are received therefrom. The RDBMS 103 performs the workload comprised of one or more queries 107 against a relational database comprised of one or more tables storing data. Specifically, the RDBMS 103 performs the functions described below, including accepting the workload comprised of the queries 107, generating one or more query execution plans (QEPs) 108 from the queries 107, and then performing the query execution plans 108 to process data retrieved from the tables. Moreover, the results from these functions may be provided directly to clients 101, or may be provided to other systems (not shown) by the interface 102, or may be stored by the RDBMS 103 in the relational database.

In one or more embodiments, the system 100 may connect to a cloud-based store 109 via the interface 102, wherein the cloud-based store 109 stores one or more objects (not shown), such as one or more datasets storing data. The cloud-based store 109 may be a distributed object store (such as S3) or a distributed file system (such as HDFS). The RDBMS 103 may retrieve the data from the objects in the cloud-based store 109, wherein the data is then stored in the relational database for use by the RDBMS 103 in processing queries 107.

Note that, in one or more embodiments, the system 100 may use any number of different parallelism mechanisms to take advantage of the parallelism offered by the multiple tier architecture, the client-server structure of the client 101, interface 102, RDBMS 103, and cloud-based store 109, as well as the multiple compute nodes 104, AMPs 105 and VDISKs 106. Further, data within the relational database may be partitioned across the compute units 104, AMPs 105 and VDISKs 106 to provide additional parallelism.

In one embodiment, each of the compute units 104 manages a portion of the database that is stored in a corresponding one of the VDISKs 106, which may be sourced from one or more objects in the cloud-based store 109. For example, the rows and/or columns of tables stored in the VDISKs 106 may be partitioned across the compute units 104 to ensure that workloads are distributed evenly across the compute nodes 104. The RDBMS 103 organizes the storage of data and the distribution of rows and/or columns of tables among the compute nodes 104. The RDBMS 103 also coordinates the execution of the query execution plans 108 by the AMPs 105, and the retrieval of data from the VDISKs 106, in response to the queries 107 received from the clients 101.

Generally, the clients 101, interface 102, RDBMS 103, compute units 104, AMPs 105, VDISKs 106, queries 107, QEPs 108, and cloud-based store 109, comprise hardware and/or software, including logic and/or data tangibly embodied in and/or accessible from a device, media, carrier, or signal, such as RAM, ROM, one or more of the data storage devices, and/or a remote system or device communicating with the computer system 100 via one or more data communications devices. The above elements 101-106 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

3. QUERY PROCESSING

Figure 2:
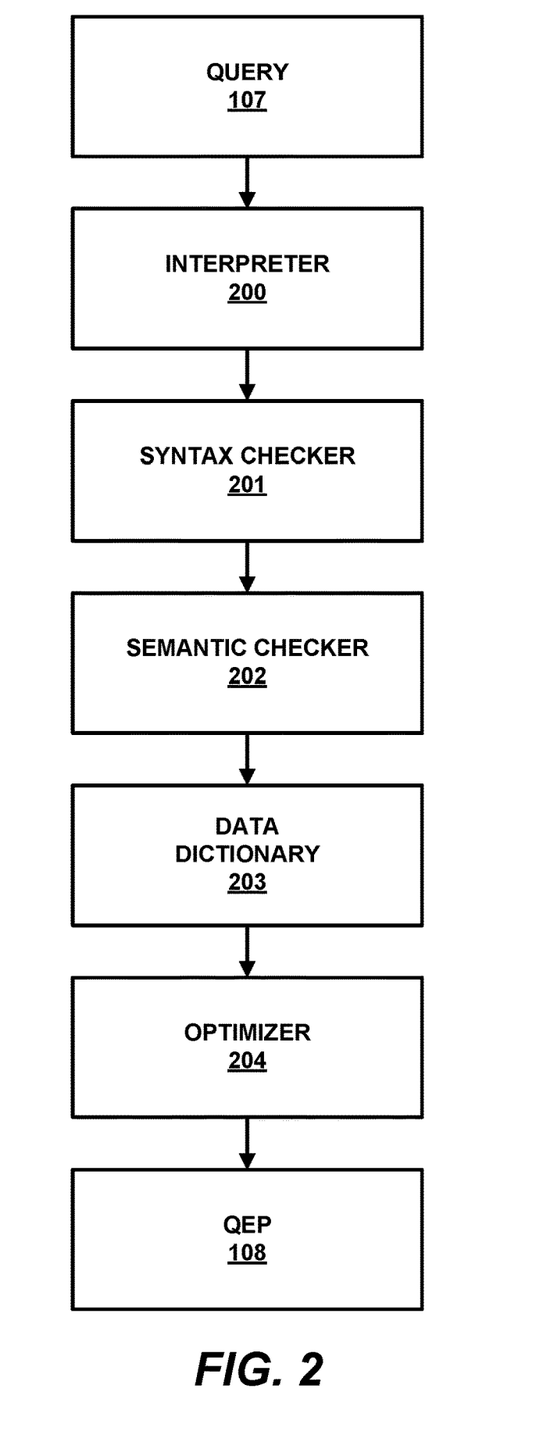
FIG. 2 illustrates the steps or functions performed by a relational database management system when processing a query, according to one embodiment of the present invention.

FIG. 2 illustrates the steps or functions performed by the RDBMS 103 when processing a query 107, which typically comprises one or more data manipulation language (DML) statements, such as an SQL query. An interpreter 200 interprets the query 107, a syntax checker 201 checks the query 107 for proper syntax, a semantic checker 202 evaluates the query 107 semantically, and consults a data dictionary 203 to ensure that all of the objects specified in the query 107 actually exist and that the user has the authority to perform the query 107. Finally, an optimizer 204 selects one or more query execution plans 108 for the query based on cost profiles, in order to execute an optimal query execution plan 108 for the query.

4 CLOUD-BASED STORE

Figure 3:
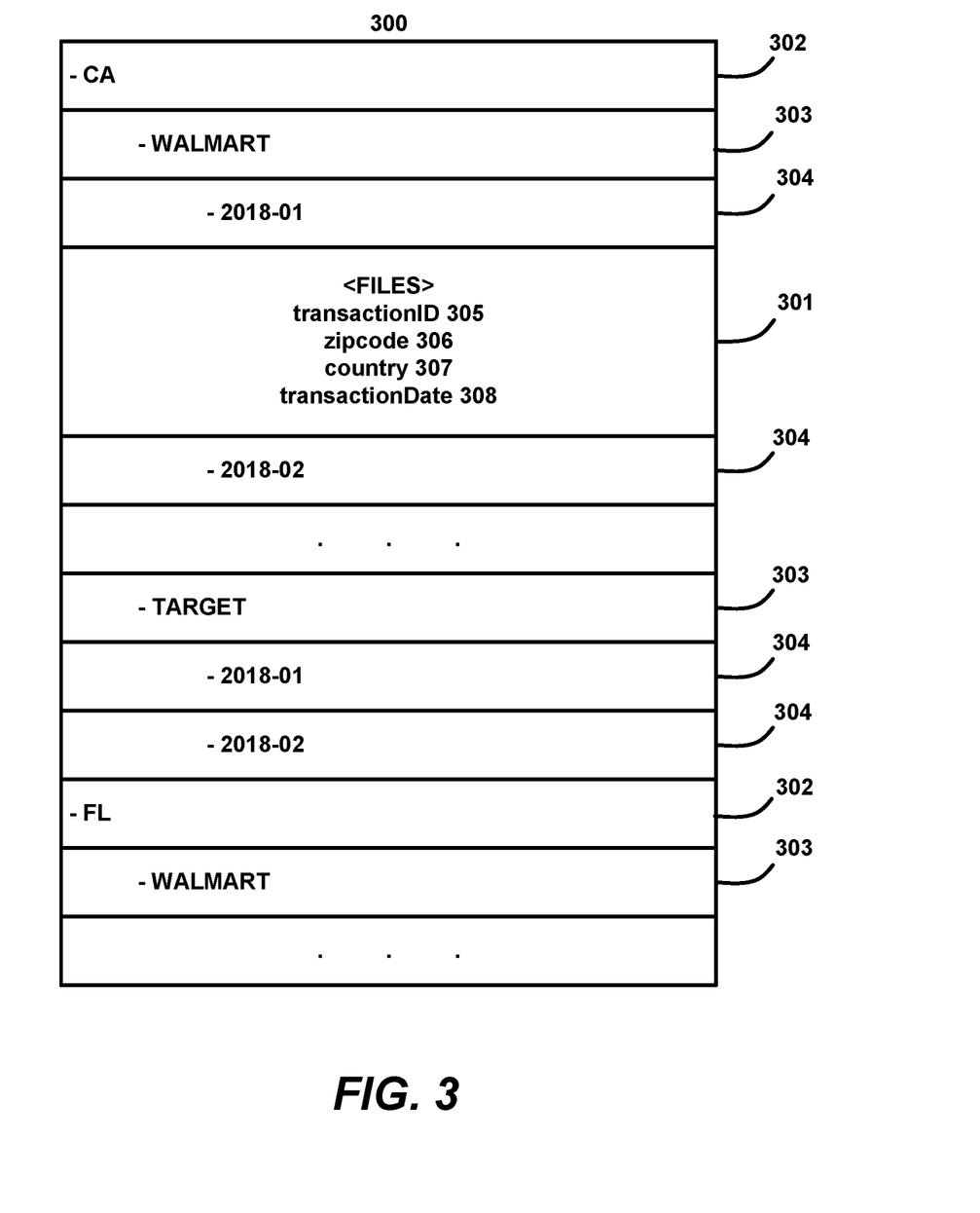
FIG. 3 is an example of a directory hierarchy in a cloud-based store according to one embodiment of the present invention.

FIG. 3 is an example of a directory hierarchy in the cloud-based store 109, namely, a sales dataset 300 comprised of a set of files 301 stored in the cloud-based store 109. The files 301 in the sales dataset 300 are organized into a directory hierarchy of columns storing attributes for State 302, StoreName 303 and Year-Month 304. In this example, the files 301 have a structure comprised of data columns, such as <transactionId 305, zipcode 306, country 307, transactionDate 308, . . . >.

In the cloud-based store 109, the dataset 300 is defined (registered) as an object, sometimes called a table, foreign table, external table, Native Object Store table, etc., depending on the vendor. When defining the dataset 300 as an object, the directory hierarchy is also captured, in this example, a 3-level directory hierarchy of columns storing attributes for State 302, StoreName 303, and YearMonth 304. In this example, the State 302, StoreName 303, and YearMonth 304 are partitioning attributes for their respective partitioning columns of the dataset 300 when the dataset 300 is retrieved by the RDBMS 103 and stored in the relational database.

In the RDBMS 103, an SQL query 107 with an explicit condition on the partitioning columns for State 302, StoreName 303, and YearMonth 304 can be optimized. For example, the following queries 107 can be all optimized at run-time by accessing only the relevant partitioning columns for State 302, StoreName 303, and YearMonth 304 and their associated directories [1, 2, 3, 4]. (Note that the syntax for referencing the partitioning columns or the data columns may differ from one system to another, e.g., $PATH syntax, column name, etc.)

Q1: SELECT*FROM sales WHERE State='CA';
Q2: SELECT*FROM sales WHERE StoreName='WalMart';
Q3: SELECT*FROM sales WHERE YearMonth='2010-02';

However, the following queries 107 cannot be optimized by state-of-the-art techniques and would require a full scan for the entire dataset 300. This is because the predicates in these queries 107 are not on the partitioning columns for State 302, StoreName 303, and YearMonth 304, but instead are only on data columns 305, 306, 307, 308 in the files 301.

Q4: SELECT*FROM sales WHERE transactionDate=DATE('22-03-1999', 'DD-MM-YYYY');
Q5: SELECT*FROM sales WHERE zipcode='90245';
Q6: SELECT*FROM sales WHERE country='USA';

The problem solved in this invention involves how to expand the optimization capabilities of the RDBMS 103 to enable optimizing queries 107 like those in Q4, Q5, and Q6, where there is a form of correlation or derivation between predicates on data columns 305, 306, 307, 308 in the files 301 and the partitioning columns 302, 303, and 304.

5 SEMANTIC CORRELATIONS

The core idea of the invention is to capture the semantic correlations or derivations between the partitioning columns 302, 303, 304, and data columns 305, 306, 307, 308 (i.e., non-partitioning columns) in the dataset 301, and then leverage this information to augment additional predicates in the query 107 over the partitioning columns 302, 303, 304, which in turn will allow for early row elimination in the processing of the query 107.

5.1 Types of Correlations
Case 1: Formula-Based Correlation (Example Q4)
In Case 1, the correlation is defined in a formula that maps a predicate on a data column 305, 306, 307, 308 in the files 301 to a partitioning column 302, 303, 304. In the dataset 300 example in FIG. 3, a function F( . . . ) would take a date and return a corresponding YearMonth 304. Hence, Q4 can be re-written as:

Q4$^+$: SELECT*FROM sales WHERE transactionDate=DATE('22-03-1999', 'DD-MM-YYYY') AND YearMonth='1999-03';

Case 2: Lookup-Based Correlation (Examples Q5-Q6)
In Case 2, the correlation is defined in a lookup data structure (e.g., an index or map structure) that maps from a data column 305, 306, 307, 308 in the files 301 to a partitioning column 302, 303, 304. In the dataset 300 example in FIG. 3, the lookup data structure takes a zipcode 306 and returns a corresponding State 302. Hence, Q5 can be re-written as:

Q5$^+$: SELECT*FROM sales WHERE zipcode='90245' AND State='CA';

For Q6, the lookup data structure takes a country 307 and returns a list for State 302. Hence, Q6 can be re-written as:

Q6$^+$: SELECT*FROM sales WHERE country='USA' AND State in ('CA', 'MA', . . . );

The lookup data structures can be implemented as map or range-map structures, which simply map from a data column 305, 306, 307, 308 of the files 301, e.g., zipcode 306, to a partitioning column, e.g., State 302. The map structure is used for categorical and discretized data, e.g., the zipcode 306 to State 302 example, whereas the range-map structure is used for continuous data, e.g., if the correlation for a transactionDate 308 to YearMonth 303 example is to be discovered autonomously (as described in Section 5.2 below), then the system 100 could capture it in a range-map structure instead of a formula.

Range-maps and formulas each has its pros and cons. For example, range-maps are more self-adaptive, but can grow large, whereas formulas are more concise and do not need any storage space, but are harder to adaptively change, especially under the presence of exceptions (violations).

5.2 Definition Mechanism for Correlations
There are two approaches to define correlations.
Case 1: Manual
In this case, a domain expert (e.g., a database administrator) would manually define the correlation in the formula or lookup data structure, with a mapping from a data column 305, 306, 307, 308 in the files 301 to a partitioning column 302, 303, 304. The syntax may vary, but basically, the information to be provided include:
which data column 305, 306, 307, 308 in the files 301 to map from,
which partitioning column 302, 303, 304 to map to,
the mapping mechanism (either the formula or lookup data structure), and
the output granularity from the mapping as:
  a single value, wherein each input value from the data column 305, 306, 307, 308 maps to a single value in the partitioning column 302, 303, 304. An example of this case is the mapping from transactionDate 308 to YearMonth 304 in Q4.
  range boundaries, wherein each input value from the data column 305, 306, 307, 308 maps to a range (min-max) in the partitioning column 302, 303, 304. An example of this case is the classical correlation between Shipdate and Receiptdata in the well-known TPC-H benchmark, e.g., a single Receiptdata would translate to a possible range over Shipdate.
  list, wherein each input value from the data column 305, 306, 307, 308 maps to a list of values in the partitioning column 302, 303, 304. An example of this case is mapping from a squared value column ($X^2$) to its roots column $[X, -X]$.

Case 2: Autonomous (or Semi-Autonomous)
This case is a more advanced approach, where the domain expert provides the system 100 with a hint on the correlated columns, e.g., zipcode 306 (a data column in the files 301) and State 302 (a partitioning column). Then, the system 100 would autonomously (or semi-autonomously) define the correlation in the formula or lookup data structure, and a mapping from a data column 305, 306, 307, 308 in the files

301 to a partitioning column 302, 303, 304, by scanning the dataset 300 and building the lookup data structure for performing the mapping.

Under the autonomous (or semi-autonomous) approach, the maintenance of the discovered correlation needs to be considered. For example, the formula or lookup data structure may need to be updated as data is updated in the dataset 300. The domain expert may provide a flag to indicate whether continuous maintenance of the formula or lookup data structure is needed as the data is updated, or whether the formula or lookup data structure is static and can be created once.

5.3 Maintenance Mechanism and Violation Handling for Correlations

Data in the cloud-based store 109 is typically "unmanaged", i.e., the RDBMS 103 does not have control over its content and hence cannot enforce correlation rules. This is unlike an RDBMS 103 that has full control on its own data and can enforce constraints. Therefore, the maintenance of correlations over the cloud-based store 109 requires verification and a strategy for violation handling.

Assume the autonomously (or semi-autonomously) defined correlations via a formula or lookup data structure (map or range-map) are inclusive in the sense that they capture all exceptions by having separate entries for the exceptions, and there is no constraint on the size. In this case, there are no exceptions to worry about.

For manually defined correlations, a verification query identifies all exception values in the data column, i.e., the mapping does not match the defined formula or lookup data structure, and an "exception list" is created of these values. Possible options to handle the exception list are:

- If the list is too large and exceeds a certain size, then the correlation is marked as "disabled," i.e., inactive and cannot be used.
- Keep the list with no further processing. Then, when the query 107 is processed, if the query 107 has a predicate involving a value from this list, then the query 107 is not optimized, and a full scan is applied on the data.
- Organize the exceptions from the list into a complementary lookup data structure (map or range-map) that complements the user-defined formula or lookup data structure. Then, when the query 107 is processed, if the predicate involves a value from the exception list, then the complementary lookup data structure is used; otherwise, the user-defined formula or lookup data structure is used.

In another aspect, newly appended data, e.g., files 301, need to be tracked and a verification query may be scheduled to execute on them. For autonomously (or semi-autonomously) defined correlations, the formula or lookup data structure will be updated accordingly (if needed). For manually defined correlations, any identified exceptions will be treated in the same way as highlighted above.

Another complementary and orthogonal approach to managing exceptions is proposed in [11], which tries to reduce the number of exceptions by adaptively adjusting the correlation definition, e.g., altering the user-defined formula to be more inclusive.

5.4 Complexity of Correlations

Case 1: Simple

The examples highlighted so far are for simple correlations, which involves a single data column 305, 306, 307, 308 in the files 301 to a single partitioning column 302, 303, 304, which is a (1-to-1) mapping, over an equality comparison operator (=). These simple correlations are easier to express and capture. The examples highlighted above are simple correlations.

Case 2: Complex

The complexity increases by considering a higher cardinality between the data columns 305, 306, 307, 308 in the files 301 and the partitioning columns 302, 303, 304, which are a 1-to-M or M-to-1 mapping. For example, if instead of a partitioning column for YearMonth 304, consider an example where Year and Month were two levels in the directory hierarchy, i.e., two partitioning columns, then the transactionDate 308 data column in the files 301 would map to two levels in the directory hierarchy instead of one.

The complexity would also increase by considering comparison operators other than equality, e.g., <, <=, >, >=, BETWEEN, etc. For example, consider the following query:

Q7: SELECT*FROM sales WHERE transactionDate BETWEEN DATE('22-03-1999', 'DD-MM-YYYY') AND DATE('14-01-2000', 'DD-MM-YYYY');

Query Q7 could be also optimized, but would need the definition of a more complex formula that takes the start and end of the predicate conditions and returns a list of corresponding YearMonth 304 values.

Under the complex case, the manual definition of correlations is more feasible. In this case, more details need to be captured to what is listed in Section 5.2 above.

5.5 Elimination Granularity

Case 1: File-Level Elimination

In this case, the correlations are exploited to skip files 301 and directories for 302, 303, 304, without reading them. This elimination type is applicable regardless of the file 301 format. All examples highlighted above are for file-level elimination.

Case 2: Sub-File Level Elimination

Figure 4:
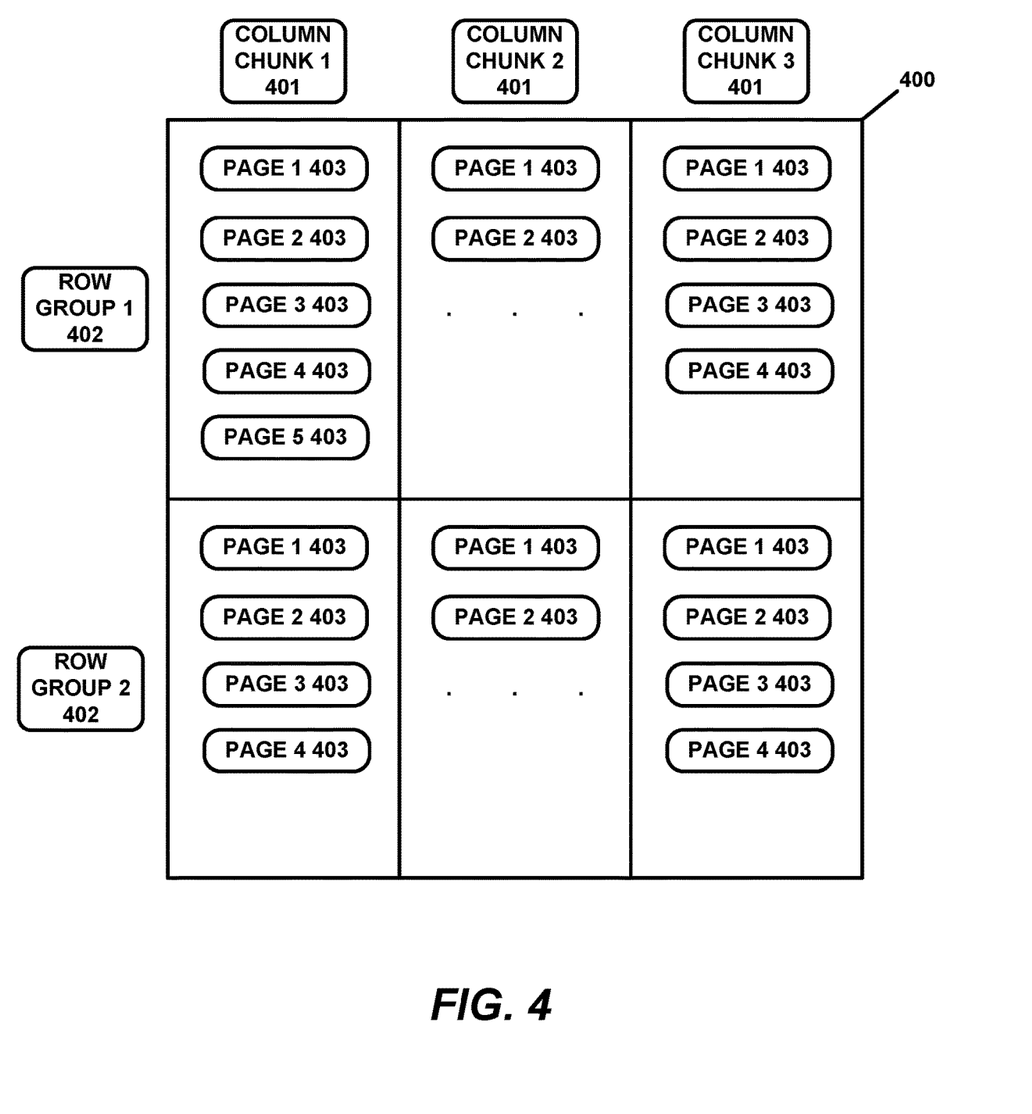
FIG. 4 is an example of a Parquet file format, according to one embodiment of the present invention.

This type of elimination is only applicable to certain file 301 formats, e.g., Parquet and ORC files, where the file 301 itself is organized internally into segments, and parts of the file 301 can be skipped.

FIG. 4 is an example of a Parquet file 400 format, which includes Column Chunks 1, 2, 3 labeled as 401, and Row Groups 1, 2 labeled as 402. Each element of the Parquet file 400 comprises Pages 1-5 labeled as 403.

In this case, the correlations can be expressed between two data columns (in contrast to the file-level elimination where the correlation is between a data column and partitioning column). For example, a correlation can be defined between Column Chunk 1 401 and Column Chunk 2 401. As a result, a predicate on Column Chunk 1 401 can be mapped to generate an additional predicate on Column Chunk 2 401. This predicate can be pushed to Parquet application programming interfaces (APIs) to eliminate Pages 1-2 403 (sub-files) from Column Chunk 2 401.

5.6 Exploitation of Correlations at Query Time

Active correlations, i.e., correlations that are not marked as disabled, can be used to optimize queries 107 at compile time. This is done through query 107 re-writes. For example, queries Q4, Q5, Q6 highlighted above in Section 4 can be re-written based on the defined correlations to Q4+, Q5+, and Q6+ as illustrated in Section 5.1.

Flowchart

Figure 5:
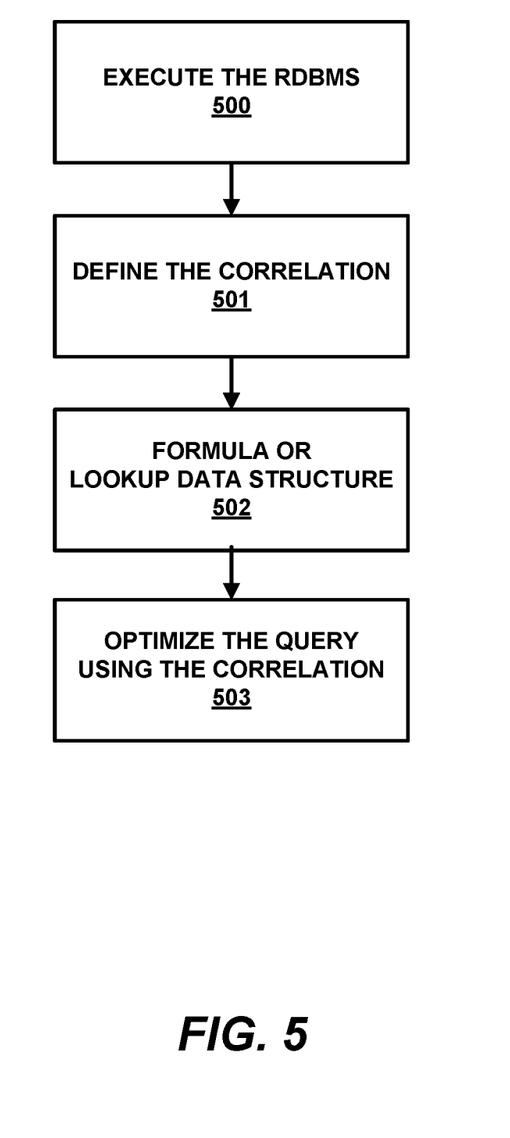
FIG. 5 is a flowchart that illustrates the processing performed for correlation-driven query optimization for cloud-based stores according to one embodiment of the present invention.

FIG. 5 is a flowchart that illustrates the processing performed for correlation-driven query optimization for cloud-based stores.

Block 500 represents the step of executing an RDBMS 103 in a computer system 100, wherein the RDBMS 103 retrieves data from the cloud-based store 109 connected to the computer system 100.

Block 501 represents the step of defining a correlation, wherein the correlation is defined in a formula or lookup data structure 502 that maps or range-maps from a data column to a partitioning column. Examples include where a formula or lookup data structure 502 takes a date and returns a corresponding year, month or day, the formula or the lookup data structure takes a zipcode and returns a corresponding state, or the formula or the lookup data structure takes a country and returns a list of states.

In one aspect, the correlation may be defined manually in the formula or lookup data structure 502 by providing information that includes: the data column to map from, the partitioning column to map to, a mapping comprising either the formula or the lookup data structure 502, and an output granularity from the mapping, wherein the output granularity comprises: a single value, wherein a single value in the data column maps to a single value in the partitioning column; range boundaries, wherein a single value in the data column maps to a range of values in the partitioning column; or a list, wherein a single value in the data column maps to a list of values in the partitioning column. This definition may include an exception list comprised of exception values in the data column generated by a verification query, wherein the exception list can be disabled, the exception list prevents optimization, or the exception list is a lookup data structure.

In another aspect, the correlation may be defined in a formula or lookup data structure 502 autonomously or semi-autonomously, by identifying the data column and the partitioning column, and scanning the dataset to construct the formula or lookup data structure 502 for performing the mapping. A flag may indicate whether the mapping requires maintenance as data is updated, or whether the mapping is static as the data is updated and can be performed once. The formula or lookup data structure 502 may be inclusive in that the formula or lookup data structure 502 captures exceptions by having separate entries for the exceptions.

The defined correlation may be a single cardinality that comprises a 1-to 1 correlation, or the correlation may be a higher cardinality that comprises a 1-to-many or many-to-1 correlation. The correlation that is the higher cardinality may map to one or more levels in a directory hierarchy, and the correlation that is the higher cardinality may use a comparison operator other than equality.

Block 503 represents the step of optimizing a query 107 in the RDBMS 103 when a predicate on a data column in the query 107 has a correlation to a partitioning attribute of a partitioning column in the data retrieved from the cloud-based store 109, wherein the optimizing uses the correlation between the data column in the query 107 to the partitioning column in the data retrieved from the cloud-based store 109 for data elimination when processing the query 107, wherein the data elimination may comprise file-level elimination or sub-file-level elimination.

7 ADVANTAGES AND BENEFITS

The problems and solutions highlighted above are not specific to specific systems or implementations. The problems and solutions apply to all database management systems and data analytics systems that access cloud-stored files through SQL queries.

Investing in cloud-based technology is a strategic goal for many customers. Optimizing queries on cloud-based platforms is a value-added feature that benefits a wide range of customers who keep their data in cloud-based stores. The innovative aspect is that exploiting the data semantics and correlations to optimize queries against cloud-based stores has not been addressed before. As highlighted in the state-of-art section, existing techniques either offer very limited optimizations, or focus on the characteristics of relational database systems.

8 REFERENCES

The following publications are incorporated by reference herein:

[1] Predicate Pushdown in Parquet and Databricks Spark, Boudewijn Braams, 2018.
[2] Accessing ORC Files from Spark, Chapter 6, CLOUDERA DOCS, 2.4.2 SPARK GUIDE, 2010.
[3] Teradata Vantage—Native Object Store Getting Started Guide, Release 17.00, 2010.
[4] A. Thusoo, R. Murthy, J. S. Sarma, Z. Shao, N. Jain, P. Chakka, S. Anthony, H. Liu, and N. Zhang. Hive—a petabyte scale data warehousing using hadoop. In ICDE, 2010.
[5] P. Brown and P. J. Haas. BHUNT: automatic discovery of fuzzy algebraic constraints in relational data. In VLDB, pages 668-679, 2003.
[6] I. F. Ilyas, V. Markl, P. Haas, P. Brown, and A. Aboulnaga. Cords: Automatic discovery of correlations and soft functional dependencies. In SIGMOD, pages 647-658, 2004.
[7] H. Kimura, G. Huo, A. Rasin, S. Madden, and S. B. Zdonik. Correlation Maps: A Compressed Access Method for Exploiting Soft Functional Dependencies. PVLDB, 2(1):1222-1233, 2009.
[8] H. Kimura, G. Huo, A. Rasin, S. Madden, and S. B. Zdonik. CORADD: correlation aware database designer for materialized views and indexes. PVLDB, 3(1):1053-1113, 2010.
[9] H. V. Nguyen, E. Muller, P. Andritsos, and K. Bohm. Detecting correlated columns in relational databases with mixed data types. In SSDBM, pages 30:1-30:12, 2014.
[10] H. Liu, D. Xiao, P. Didwania, and M. Y. Eltabakh. Exploiting soft and hard correlations in big data query optimization. Proc. VLDB Endow., 9(12):1005-1016, 2016.
[11] Mohamed Eltabakh, Mohammed Al-Kateb, Sanjay Nair, Paul Sinclair, Grace Au, Versatile Management of Soft Correlations in Semantic Query Optimization for Scalable Analytics, U.S. patent, DN17-1037, 2018.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method, comprising:
   executing a relational database management system (RDBMS) in a computer system, wherein the RDBMS retrieves data from a cloud-based store connected to the computer system, the data in the cloud-based store is a set of files comprised of data columns organized into one or more levels of a directory hierarchy representing one or more partitioning columns for the set of files, each of the levels of the directory hierarchy corresponding to a different one of the partitioning columns, and the data retrieved by the RDBMS from the cloud-based store is stored in a relational database managed by the RDBMS for use by the RDBMS in processing queries; and optimizing a query in the RDBMS when a predicate on one of the data columns in the query has a semantic correlation to a partitioning attribute of the partitioning columns in the data retrieved by the RDBMS from the cloud-based store, wherein;

the optimizing uses the semantic correlation to perform a mapping of the predicate on the one of the data columns in the query to the partitioning attribute of the partitioning columns by accessing only the data in the levels of the directory hierarchy corresponding to the partitioning attribute of the partitioning columns when the data is retrieved by the RDBMS from the cloud-based store for data elimination when processing the query, the semantic correlation is defined autonomously by identifying the data columns and the partitioning columns, and scanning the dataset to construct a formula or lookup data structure to perform the mapping, and a flag indicates whether the mapping requires maintenance as data changes, or whether the mapping is static as the data changes and can be performed once.

2. The method of claim 1, wherein the semantic correlation is defined in a formula or lookup data structure that maps or range-maps from the predicate on the one of the data columns to the partitioning attribute of the partitioning columns.

3. The method of claim 2, wherein the semantic correlation is defined manually by providing information that includes:
the data columns to map from,
the partitioning columns to map to,
a mapping comprising either the formula or lookup data structure, and
an output granularity from the mapping.

4. The method of claim 3, further comprising including an exception list comprised of exception values in the data columns generated by a verification query.

5. The method of claim 4, wherein the exception list can be disabled, the exception list prevents optimization, or the exception list is a lookup data structure.

6. The method of claim 3, wherein the output granularity comprises:
a single value, wherein a single value in the one of the data columns maps to a single value in one of the partitioning columns;
range boundaries, wherein a single value in the one of the data columns maps to a range of values in one of the partitioning columns; or
a list, wherein a single value in the one of the data columns maps to a list of values in one of the partitioning columns.

7. The method of claim 1, wherein the formula or lookup data structure is inclusive in that the formula or lookup data structure captures exceptions by having separate entries for the exceptions.

8. The method of claim 1, wherein the semantic correlation is a single cardinality that comprises a 1-to 1 correlation.

9. The method of claim 1, wherein the semantic correlation is a higher cardinality that comprises a 1-to-many or many-to-1 correlation.

10. The method of claim 9, wherein the semantic correlation that is the higher cardinality maps to one or more levels in a directory hierarchy.

11. The method of claim 9, wherein the semantic correlation that is the higher cardinality uses a comparison operator other than equality.

12. The method of claim 1, wherein the data elimination comprises file-level elimination.

13. The method of claim 1, wherein the data elimination comprises sub-file-level elimination.

14. The method of claim 1, wherein the cloud-based store is a distributed object store.

15. The method of claim 1, wherein the cloud-based store is a distributed file system.

16. A computer-implemented apparatus, comprising:
a computer system including at least one processor;
a relational database management system (RDBMS) executing in the computer system, wherein the RDBMS retrieves data from a cloud-based store connected to the computer system, the data in the cloud-based store is a set of files comprised of data columns organized into one or more levels of a directory hierarchy representing one or more partitioning columns for the set of files, each of the levels of the directory hierarchy corresponding to a different one of the partitioning columns, and the data retrieved by the RDBMS from the cloud-based store is stored in a relational database managed by the RDBMS for use by the RDBMS in processing queries; and
the RDBMS optimizing a query when a predicate on one of the data columns in the query has a semantic correlation to a partitioning attribute of the partitioning columns in the data retrieved by the RDBMS from the cloud-based store, wherein;
the optimizing uses the semantic correlation to perform a mapping of the predicate on the one of the data columns in the query to the partitioning attribute of the partitioning columns by accessing only the data in the levels of the directory hierarchy corresponding to the partitioning attribute of the partitioning columns when the data is retrieved by the RDBMS from the cloud-based store for data elimination when processing the query,
the semantic correlation is defined autonomously by identifying the data columns and the partitioning columns, and scanning the dataset to construct a formula or lookup data structure to perform the mapping, and
a flag indicates whether the mapping requires maintenance as data changes, or whether the mapping is static as the data changes and can be performed once.

17. A computer program product, the computer program product comprising a non-transitory computer readable storage medium having program instructions tangibly embodied therewith, the program instructions executable by a computer system to cause the computer system to perform a method, comprising:
executing a relational database management system (RDBMS) in the computer system, wherein the RDBMS retrieves data from a cloud-based store connected to the computer system, the data in the cloud-based store is a set of files comprised of data columns organized into one or more levels of a directory hierarchy representing one or more partitioning columns for the set of files, each of the levels of the directory hierarchy corresponding to a different one of the partitioning columns, and the data retrieved by the RDBMS from the cloud-based store is stored in a relational database managed by the RDBMS for use by the RDBMS in processing queries; and optimizing a query in the RDBMS when a predicate on one of the data columns in the query has a semantic correlation to a partitioning attribute of the partitioning columns in the data retrieved by the RDBMS from the cloud-based store, wherein:

the optimizing uses the semantic correlation to perform a mapping of the predicate on the one of the data columns in the query to the partitioning attribute of the partitioning columns by accessing only the data in the levels of the directory hierarchy corresponding to the partitioning attribute of the partitioning columns when the data is retrieved by the RDBMS from the cloud-based store for data elimination when processing the query, the semantic correlation is defined autonomously by identifying the data columns and the partitioning columns, and scanning the dataset to construct a formula or lookup data structure to perform the mapping, and a flag indicates whether the mapping requires maintenance as data changes, or whether the mapping is static as the data changes and can be performed once.

* * * * *